United States Patent
Weber (10) Patent No.: US 9,182,133 B1
(45) Date of Patent: Nov. 10, 2015

(54) WALL CONSTRUCTION SYSTEM AND COMPONENT THEREOF

(71) Applicant: Mark R. Weber, Chicago, IL (US)

(72) Inventor: Mark R. Weber, Chicago, IL (US)

(*) Notice: Subject to any disclaimer, the term of this patent is extended or adjusted under 35 U.S.C. 154(b) by 0 days.

(21) Appl. No.: 14/259,961

(22) Filed: Apr. 23, 2014

(51) Int. Cl.
| | |
|---|---|
| E04D 13/18 | (2014.01) |
| F24D 3/14 | (2006.01) |
| E04C 1/39 | (2006.01) |
| E04F 19/00 | (2006.01) |
| F24D 3/18 | (2006.01) |

(52) U.S. Cl.
CPC ............... *F24D 3/142* (2013.01); *E04C 1/392* (2013.01); *E04C 1/397* (2013.01); *E04F 19/00* (2013.01); *F24D 3/145* (2013.01); *F24D 3/18* (2013.01)

(58) Field of Classification Search
CPC .......... E04B 2/64; E04B 2/14; E04B 1/4178; E04C 1/00; E04C 1/397; E04C 1/40; E04C 1/395; E02D 29/025; F24D 3/145; F24D 3/142
USPC ............ 52/173.1, 220.2, 220.3, 302.3, 302.4, 52/504, 606, 607, 378, 379, 574, 596
See application file for complete search history.

(56) References Cited

U.S. PATENT DOCUMENTS

| | | | |
|---|---|---|---|
| 1,633,191 A | 6/1927 | Reagan | |
| 2,482,556 A * | 9/1949 | Petras | .............................. 52/314 |
| 2,603,458 A | 7/1952 | Graham, Jr. | |
| 2,681,796 A | 6/1954 | Rapp | |
| 4,391,077 A | 7/1983 | Giess | |
| 4,415,798 A | 11/1983 | Knappe | |
| 4,622,796 A * | 11/1986 | Aziz et al. | ................... 52/747.12 |
| 4,646,814 A | 3/1987 | Fennesz | |
| 4,651,485 A * | 3/1987 | Osborne | .......................... 52/284 |
| 5,327,737 A | 7/1994 | Eggemar | |
| 5,461,213 A | 10/1995 | Rodin | |
| 5,560,172 A * | 10/1996 | Brophy et al. | ................... 52/596 |
| 5,809,720 A * | 9/1998 | Sauve | .......................... 52/302.4 |
| 5,826,395 A * | 10/1998 | Weaver | ............................ 52/606 |
| 5,964,067 A * | 10/1999 | Lehner et al. | ................ 52/220.2 |
| 6,189,282 B1 | 2/2001 | Vander Werf | |
| 6,250,038 B1 * | 6/2001 | Akamine | ......................... 52/604 |
| 6,739,097 B1 | 5/2004 | Rodin | |
| 8,240,108 B2 * | 8/2012 | Pyo | ............................. 52/742.14 |
| 8,359,808 B2 * | 1/2013 | Stephens, Jr. | .............. 52/742.14 |
| 8,549,811 B2 * | 10/2013 | Dyson | ............................ 52/604 |
| 9,016,668 B1 | 4/2015 | Christensen et al. | |

(Continued)

FOREIGN PATENT DOCUMENTS

| | | |
|---|---|---|
| FR | 2 928 671 | 3/2008 |
| WO | WO 2013/171466 A1 | 11/2013 |

OTHER PUBLICATIONS

International Search Report and Written Opinion dated Jul. 14, 2015, for International Application No. PCT/US15/27093, Applicant, Mark R. Weber. (8 pages).

*Primary Examiner* — Brian Mattei
(74) *Attorney, Agent, or Firm* — McCracken & Gillen LLC (57) ABSTRACT

A wall construction system comprises a number of courses of masonry construction blocks stacked one atop another in any desired pattern, such as a running bond pattern. One or more fluid conduits are disposed in thermal communication with one or more of the masonry construction blocks and one or more fluids are passed through the fluid conduits. The fluid(s) may comprise one or more liquids, one or more gases, or a combination of liquid(s) and gas(es). The fluid(s) can transfer heat between an enclosed environment, such as a room, and the material of the masonry construction blocks.

26 Claims, 7 Drawing Sheets

(56) References Cited

U.S. PATENT DOCUMENTS

| | | | |
|---|---|---|---|
| 2004/0026525 A1* | 2/2004 | Fiedrich | 237/69 |
| 2006/0090326 A1 | 5/2006 | Corbett | |
| 2006/0144578 A1* | 7/2006 | Fiedrich | 165/168 |
| 2006/0156656 A1 | 7/2006 | Robinson | |
| 2009/0314848 A1* | 12/2009 | Andersson | 237/71 |
| 2011/0113707 A1* | 5/2011 | Stephens, Jr. | 52/220.2 |
| 2013/0042559 A1* | 2/2013 | Weber | 52/439 |

* cited by examiner

WALL CONSTRUCTION SYSTEM AND COMPONENT THEREOF

CROSS REFERENCE TO RELATED APPLICATIONS

None

REFERENCE REGARDING FEDERALLY SPONSORED RESEARCH OR DEVELOPMENT

Not applicable

SEQUENTIAL LISTING

Not applicable

BACKGROUND OF THE DISCLOSURE

1. Field of the Background

The present invention generally relates to construction materials, and more particularly, to a system for constructing a wall and a component thereof.

2. Description of the Background

Typical concrete wall structures are fabricated using concrete masonry units (CMU's—otherwise referred to as concrete blocks) that are positioned in courses atop a foundation and joined to one another by mortar. Ordinary CMU's include planar front and rear faces and, often, two or three spaced webs extending between the front and rear faces. The webs define one or two voids extending fully from top to bottom of the CMU. Outermost webs may comprise planar or recessed end faces of the CMU. The CMU is typically formed from cast concrete or other materials.

Building a structure using CMU's involves constructing one of more walls by assembling the CMU's together with other building structural components, insulating at least outer walls, covering inner portions of the outer walls and inner walls with gypsum board or plaster, and providing separate heating and/or cooling systems for the resulting structure. This is a time-consuming process that is best undertaken by skilled tradespersons, such as a mason, a heating and cooling contractor, a plasterer, and the like. The need for multiple tradespersons increases expense and involves complexity in terms of appropriately scheduling the various tradespersons during the construction process. Further, a delay involving one of the construction phases can result in an overall delay in constructing the structure, which, in turn, can further increase costs.

Shaw U.S. Pat. No. 6,464,432 discloses a retaining wall comprised of specialized blocks. Each block includes front, back, and two side walls that together define a void. Shaw discloses multiple embodiments, all of which include a means for interlocking adjacent blocks in the vertical and/or horizontal direction.

Blomquist et al. U.S. Pat. No. 6,488,448 discloses a retaining wall system that comprises a plurality of different sized blocks assembled together in varying combinations to construct a retaining wall. Specifically, first, second, and third blocks are all of the same width but differ in length. Further, the second and third blocks have the same height, which is different than the height of the first block. Varying combinations of the first, second, and third blocks are assembled to form six different modules all of the same height, width, and depth.

Azar U.S. Pat. No. 6,226,951 discloses a block comprising first and second congruent panels joined together by at least one web. Each panel has vertical end edges with offset notches to interfit with the end edges of an adjacent block. The offset of the notches allows any two blocks to be placed adjacent to one another without orienting either face of the block in a particular direction. Specifically, at a first end, the notch on the edge of the first panel is on the outside of the block, while the notch on the edge of the second panel at the first end is on the inside of the block. At a second end, the notch of the first panel is on the inside of the block, and the notch of the second panel of the second end is on the outside of the block. Additionally, each of the first and second panels has lower and upper surfaces, wherein the lower surface is inset slightly and the upper surface protrudes slightly. The complementary shape permits a block to interfit with another block along the upper and lower surfaces.

Crespo U.S. Pat. No. 4,514,949 discloses a metal channel leveler utilized to level and to support a wall. In the preferred embodiment, the metal channel leveler becomes part of a footing. The leveler is positioned between two parallel form boards having wall footings and receives a first course of blocks. The top elevation of the form boards are above the bottom surface of the blocks of the first course. Once concrete is poured, the footing encompasses the leveler and a bottom portion of each block of the first course. The metal channel leveler comprises a steel channel with grooves along a bottom surface, a plurality of steel angles, and a plurality of threaded leveling screws. The steel channel is supported by the steel angles perpendicular to the channel fitting into the grooves. The ends of the angles rest on the form board wall footings. Each end has a threaded leveling screw to enable the user to adjust the height and level of the channel both crosswise and lengthwise. In another embodiment, the metal channel leveler is adapted for use on a floor slab. The leveler comprises a steel channel with sides having an outer surface, a plurality of ledges on the outer surfaces of the sides of the channel, and threaded machine screws in each ledge. The height or level of the channel is adjusted by rotating the machine screws.

SUMMARY OF THE DISCLOSURE

In accordance with one aspect, a masonry construction block includes a main body including a first face, a second face opposite the first face, and an intermediate portion disposed between the first and second faces. First and second walls extend into the intermediate portion and define a channel for accepting a fluid conduit therein In accordance with a further aspect, a wall construction system comprises a plurality of masonry construction blocks each including a plurality of channels disposed in a face thereof. The blocks of the plurality of masonry construction blocks are assembled together such that a channel of one of the masonry construction blocks is aligned with a channel of another of the masonry construction blocks. At least one fluid conduit is disposed in the aligned channels of the one and another masonry construction blocks.

In accordance with yet another aspect, a wall construction system includes a first plurality of masonry construction blocks each having a second plurality of channels disposed in a face thereof. The masonry construction blocks of the first plurality are assembled together such that channels of each of the first plurality of masonry construction blocks are aligned with channels of others of the first plurality of masonry construction blocks to form a third plurality of aligned channels. In addition, a fourth plurality of fluid conduits is disposed in at least some of the third plurality of aligned channels.

DETAILED DESCRIPTION OF THE DRAWINGS

As shown in the attached FIGS., the wall construction system of the present invention comprises a number of courses of masonry construction blocks stacked one atop another in any desired pattern, such as a running bond pattern. One or more fluid conduits are disposed in thermal communication with one or more of the masonry construction blocks and one or more fluids are passed through the fluid conduits. The fluid(s) may comprise one or more liquids, one or more gases, or a combination of liquid(s) and gas(es). The fluid(s) can transfer heat between an enclosed environment, such as a room, and the material of the masonry construction blocks. In the drawings, like reference numerals identify like structures throughout.

Figure 1:
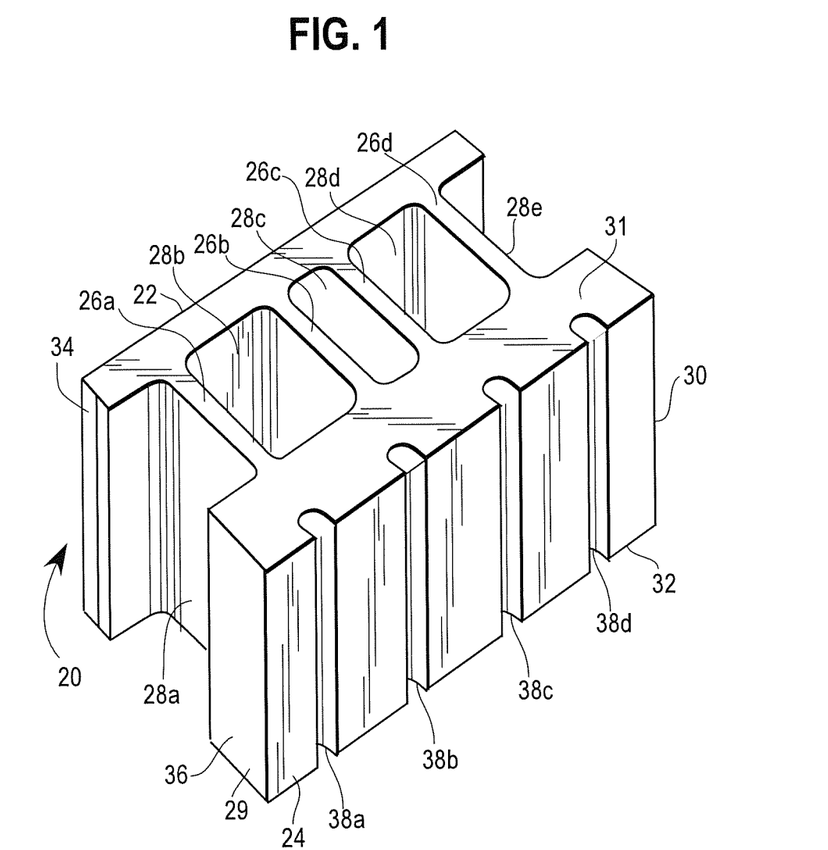
FIG. 1 is an isometric view of a masonry construction block according to a first aspect.
Figure 2:
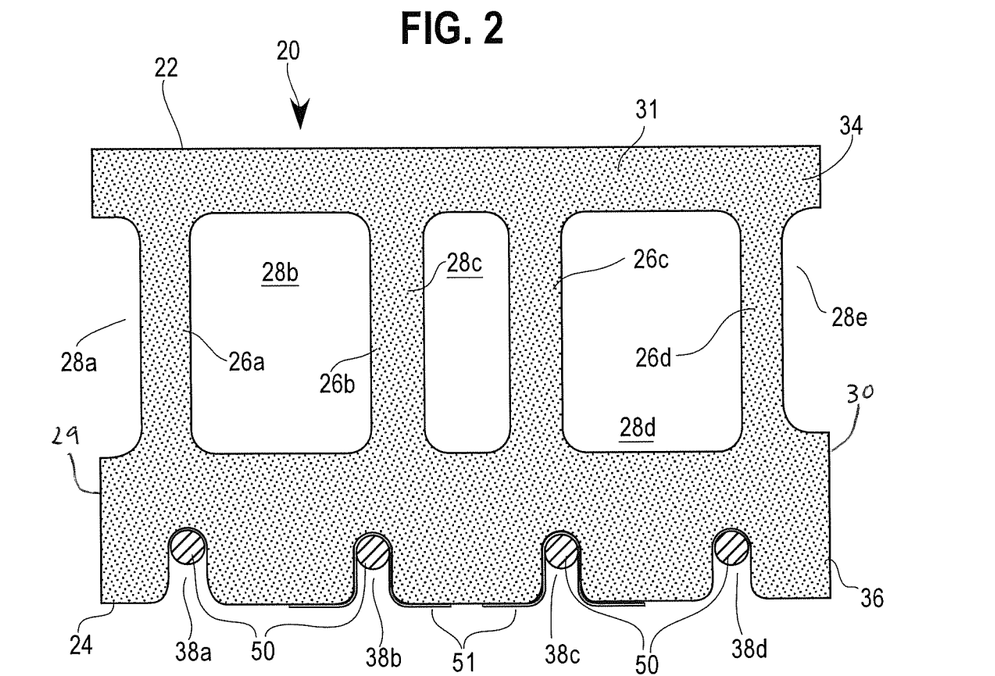
FIGS. 2 and 3 are plan and front elevational views, respectively, of the masonry construction block of FIG. 1.
Figure 3:
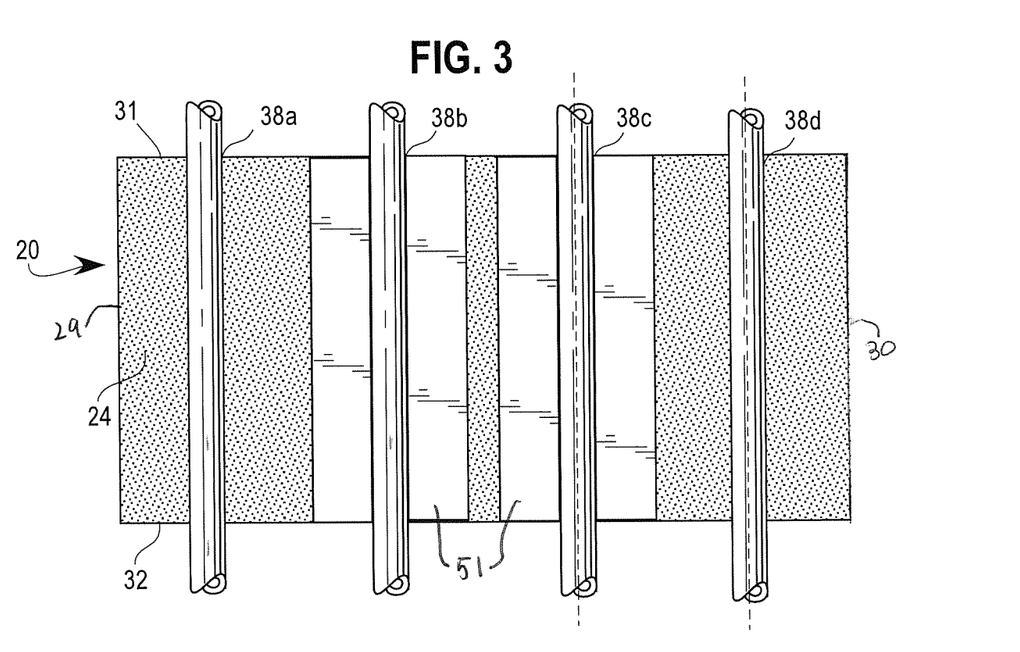

Specifically, as shown in FIGS. 1 through 3, a masonry construction block 20 includes a first face 22, a second face 24, and a plurality of spaced webs 26a-26d extending between the first and second faces 22, 24. Spaced voids 28a-28e are defined by the faces 22, 24 and the spaced webs 26a-26d. The block 20 may instead include any number of webs extending between the faces 22, 24 to form any number of voids, as desired. The block 20 may alternatively, or in addition, include webs extending between the faces 22, 24 at lateral end portions 29, 30 thereof so that all of the voids are fully enclosed. In any event, the block 20 may include planar or non-planar upper and lower faces 31, 32, respectively.

Figure 7:
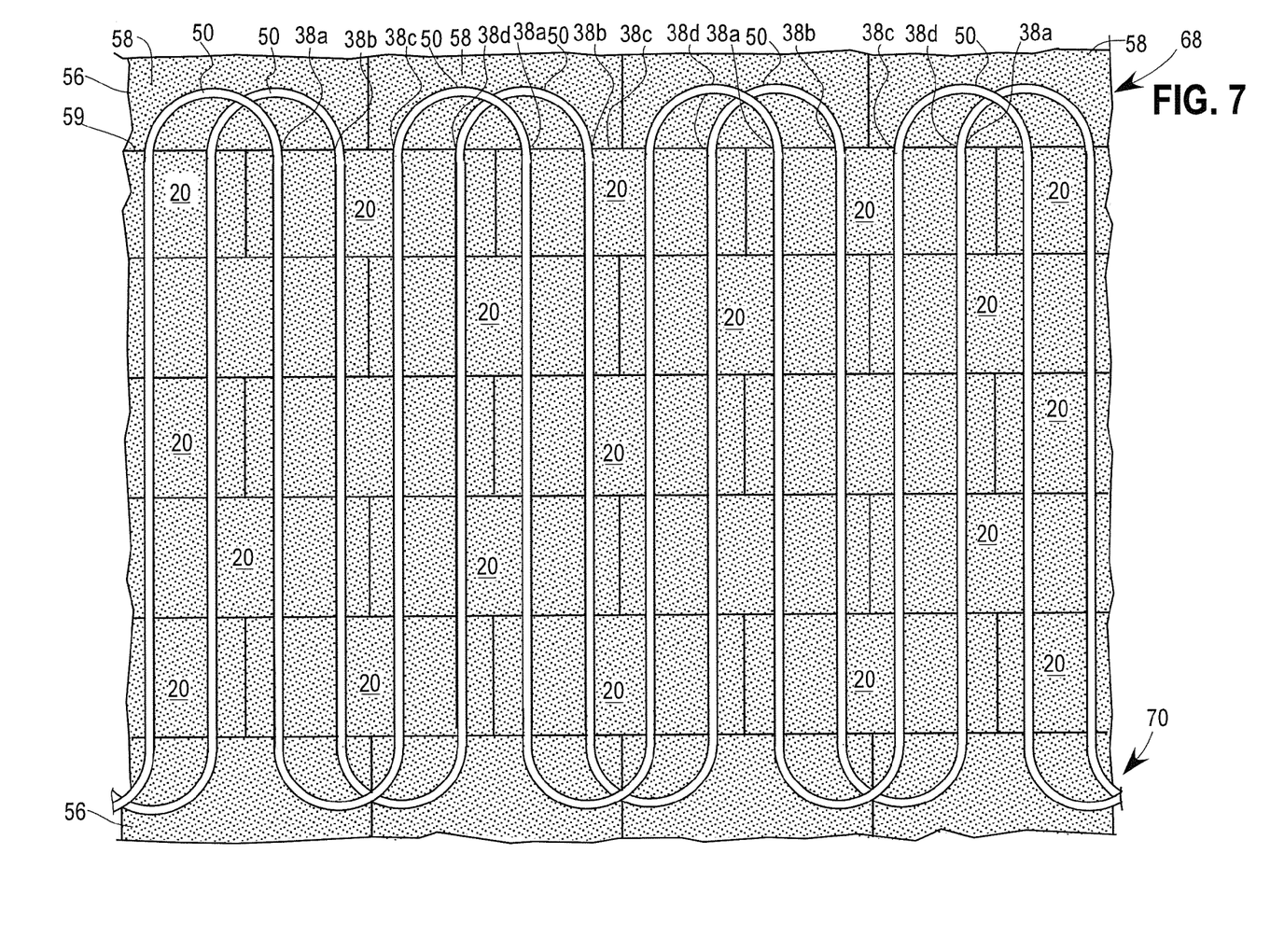
FIG. 7 is a front elevational view of a wall section assembled using the masonry construction blocks of FIGS. 1-6 with fluid conduits.

In the illustrated embodiment, the first face 22 of the block 20 comprises an outer surface of an outer portion 34 opposite an inner portion 36 of the block 20. Preferably, the outer portion has a thickness substantially the same as a thickness of a corresponding outer portion of a conventional CMU. On the other hand, the inner portion 36 is substantially thicker than a corresponding inner portion of a conventional CMU, and further, is substantially thicker than the outer portion 34. This increased thickness permits channels 38a-38d to be formed in any suitable fashion in the portion 36 while retaining a required strength of the block 20. Preferably, each of the channels 38a-38d is linear and all are parallel to one another and extend perpendicular to the upper and lower faces 31, 32. It should be noted that the channels 38 need not be linear or parallel to one another, nor must the channels be disposed perpendicular to the upper and lower faces; instead, the channels 38 may be of other shapes and/or orientations. Still further in the embodiment, each of the channels 38a-38d is spaced from adjacent channels 38 by distances such that, when the block 20 is assembled in a wall with other blocks 20 in a desired pattern (such as a running bond) the channels of each block 20 are aligned with the channels of blocks immediately above and below the block 20, as seen in FIG. 7. In the illustrated embodiment, the channels 38a-38d are spaced a distance d from one another, and the channels 38a and 38d are spaced a distance d/2 from adjacent lateral end portions 29, 30, respectively, of the block 20 (see FIG. 3). Such a spacing facilitates the assemblage of blocks 20 into a running bond pattern using a cementitious material, for example, mortar or grout to position and set blocks.

Referring to FIGS. 1-3, each block 20 may be substantially rectangular in shape and may be 16 inches wide, 10 inches deep and 8 inches tall. The 10 inch depth comprises 8 inches corresponding to the depth of a conventional CMU plus an additional 2 inch depth for the inner portion 36. Also in the illustrated embodiment, d equals 4 inches. Each channel may be about 0.625 inches wide and about 1.5 inches deep, and may be U-shaped in cross-section. The block 20 may be made of any cementitious or other material(s), such as a conventional CMU material. It should be noted that these dimensions, shapes, and/or material(s) are exemplary only, and any or all of the dimensions, shapes, and/or material(s) may be varied as necessary or desirable.

Figure 4:
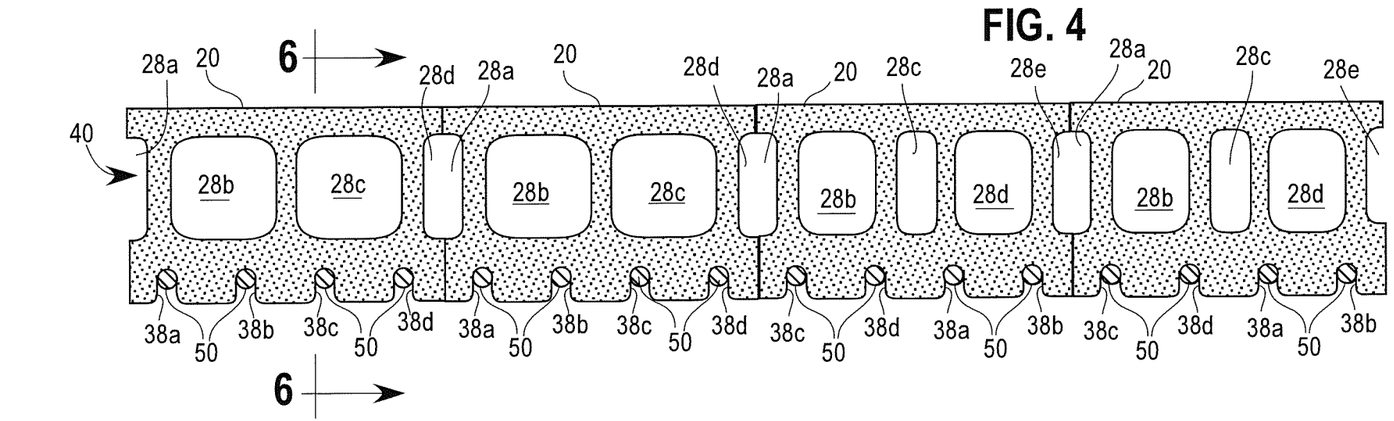
FIGS. 4 and 5 are plan views of a first course of the masonry construction blocks of FIGS. 1-3 and a second course of the masonry construction blocks of FIGS. 1-3 atop the first course wherein the courses of FIGS. 4 and 5 are shown aligned with one another.
Figure 5:
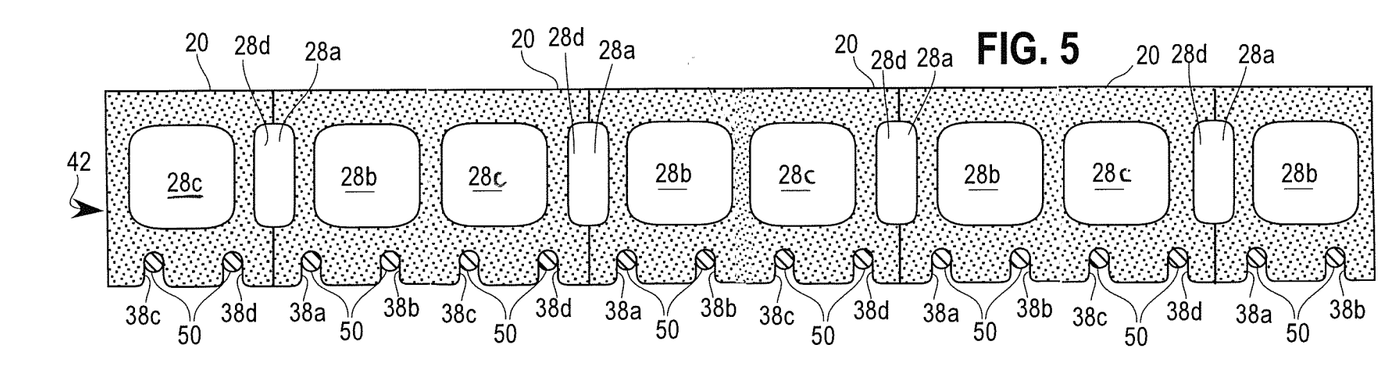
Figure 8:
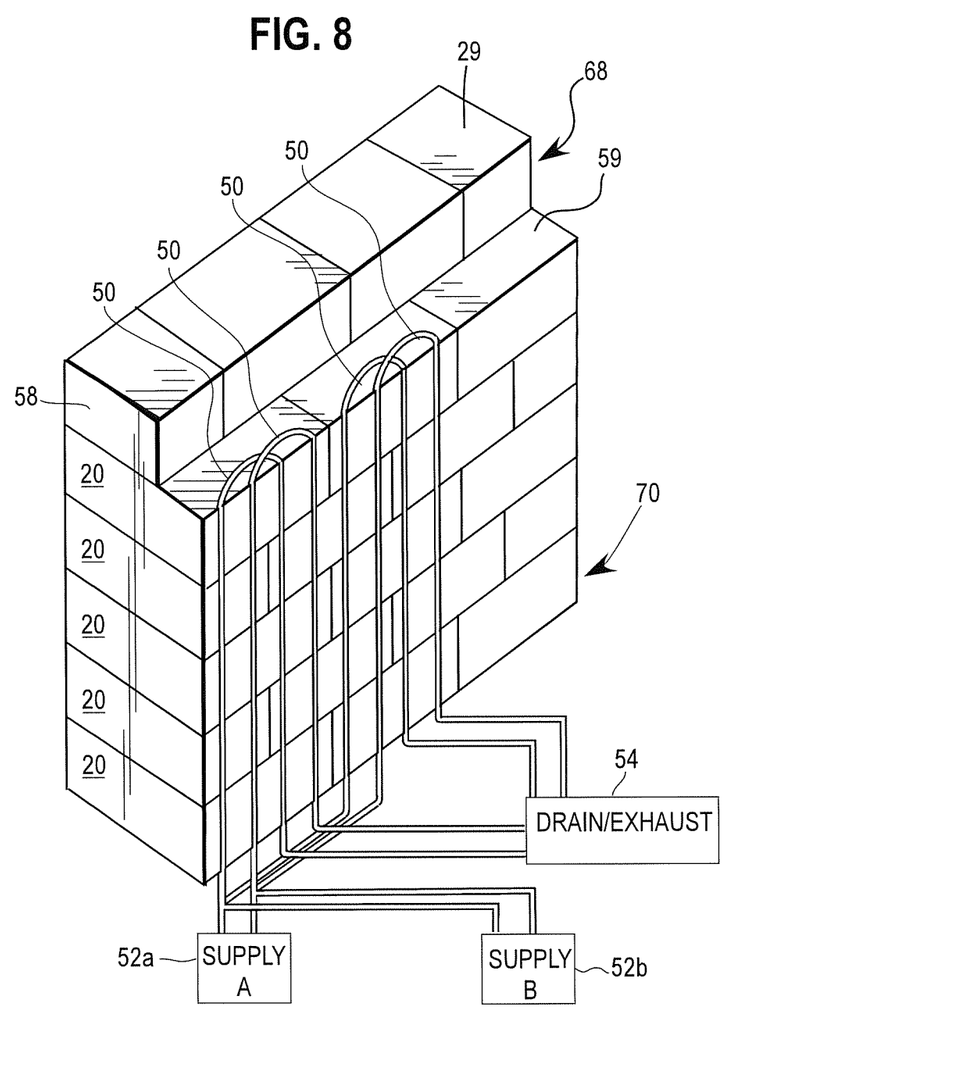
FIG. 8 is a schematic diagram of a wall showing fluidic components in fluid communication with fluid conduits.

Referring to FIGS. 4 and 5, a first course (FIG. 4) 40 comprises a plurality of blocks 20 positioned and held by cementitious material (not shown in the FIGS.) end-to-end on a prepared surface 41, such as a footing. A second course 42 is assembled using cementitious material atop the first course 40. Remaining courses are assembled using mortar atop the first and second courses until the wall is complete. Remaining walls are assembled in the same way. One or more sections of flexible tubing or another flexible or rigid conduit 50 is disposed in the aligned channels 38 as seen in FIGS. 7 and 8 and are retained therein by any suitable means, such as a friction fit, adhesive, mechanical fasteners, or the like. As shown in FIG. 2, a material 51 such as a reflective foil may be disposed between the conduit 50 and the channel 38 to receive and/or reflect radiation (i.e., heat) into the room. If desired, and as shown in FIG. 3, the material 51 may extend to outside of and to the sides of each channel 38. As seen in FIG. 8 the conduit section(s) 50 are coupled between one or more fluid sources, here shown as first and second sources 52a, 52b, and drain or exhaust 54. Appropriate valving components and other fluid control components may be used. The various conduit section(s) 50 are preferably interconnected in parallel between the fluid source(s) 52 and drain/exhaust 54, although any interconnection scheme may be used. The conduit section(s) 50 are made of one or more suitable thermally conductive material(s) such as plastic, rubber, metal, or the like. Fluid-tight interconnections are made between conduit section(s) 50 and remaining fluid components.

As seen in FIGS. 7 and 8 a top, bottom, or any other course 56 may optionally comprise a set of conventional CMU's 58 each having, for example, an 8 inch depth. This results in a 2 inch exposed surface 59 at the top of the blocks 20 of the course just below the course 56. Access is thus provided to permit the conduit section(s) 50 to be formed into partial loops so that the section(s) may extend from one channel into another channel. In the embodiment shown in FIG. 7, the conduit sections 50 extend from one channel into another channel at both of the head 68 and the foot 70 of the wall. In another embodiment, the conduit sections 50 extend from one channel into another at only one of the head 68 and the foot 70 of the wall. In the embodiment shown in FIG. 8, the conduit 50 extends between channels at the head 68 of the wall and is coupled to fluid sources 52a, 52b and the drain/exhaust 54 at the foot 70 of the wall.

Figure 6:
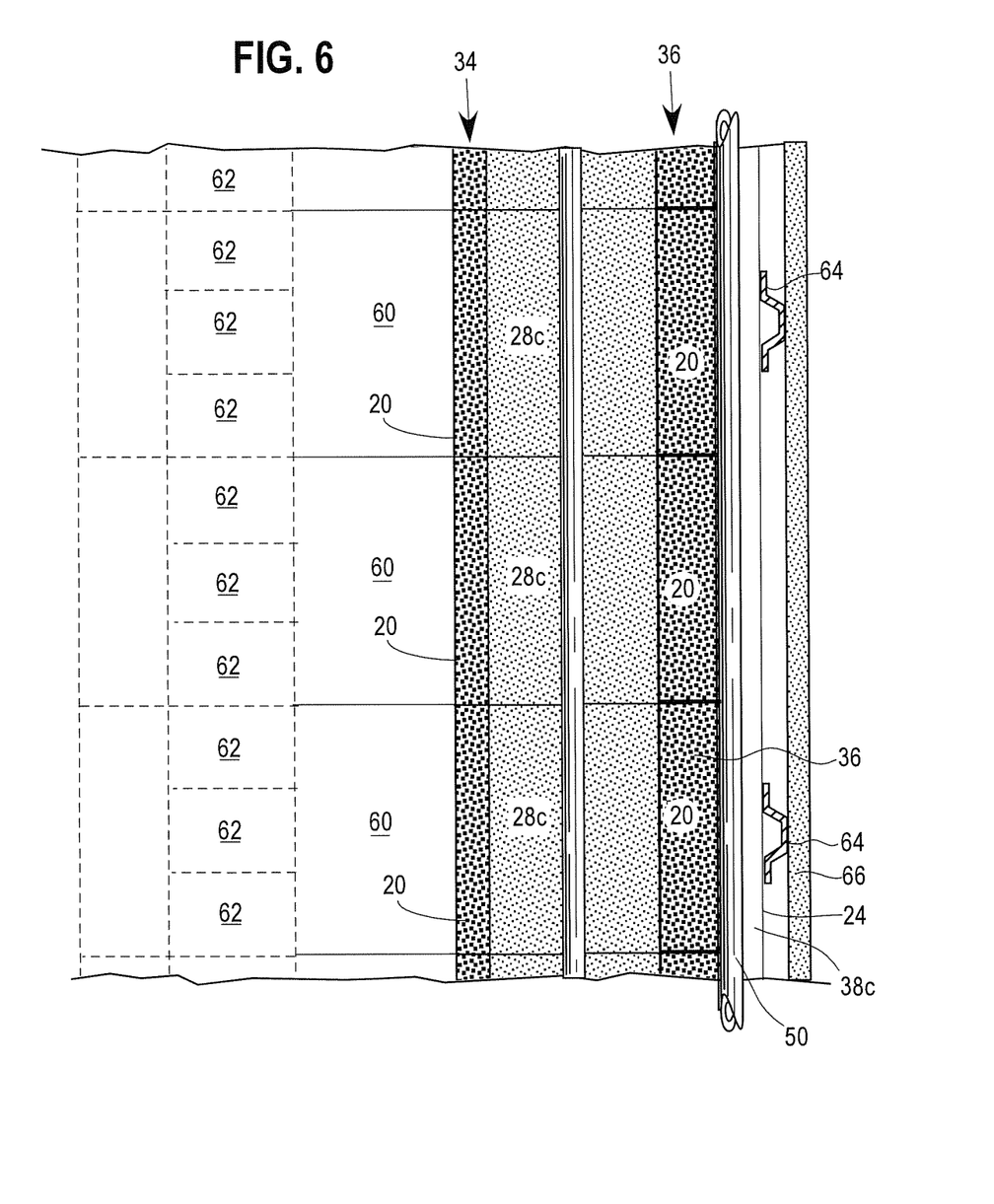
FIG. 6 is a sectional view taken generally along the lines 6-6 of FIG. 4.

In the illustrated embodiment seen in FIG. 6, the resulting walls may be covered with insulation 60 adjacent the outer portions 34 and a facing material, such as brick 62, may be applied to the insulation 60. Horizontal furring strips 64 may be secured to the second face 24 and an inner surface material 66, such as gypsum board or a plaster and lath covering, may be applied to the furring strips 64.

If desired, furring strips may be vertically disposed to allow convective and/or forced air flow, for example, to minimize moisture build-up. Further, one could add one or more thermally conductive surface(s) covering the tubing in the wall. In the example shown in FIG. 6, horizontal furring strips 64 may be applied directly between the block 20 and the sheet rock or other wall structure applied thereto. Vertical furring strips may also be secured to horizontal furring strips 64, for example, between the block 20 and the horizontal furring strips 64, or between horizontal furring strips 64 and the sheet rock, or between the sheet rock and the other wall structure.

In one embodiment, the fluid source(s) 52 supply heated or chilled fluid to the conduit section(s) 50. The heated or chilled fluid circulates through the conduit section(s) 50 and exits through the drain or exhaust 54. The thermal mass comprising the blocks 20 and associated mortar is heated or cooled by the fluid flowing through the conduit section(s) 50. Heat transfer occurs between the space enclosed by the walls and the thermal mass thus heating or cooling the enclosed space. In this regard, openings may be provided in the inner surface material 66 so that air can circulate between the enclosed space and the thermal mass to facilitate heat transfer. Such openings can be covered by louvers and one or more blowers can assist in air circulation, if desired.

In the case where heat is supplied from the thermal mass to the enclosed space, no particular provision may be required for removal of water vapor or condensed water from the walls. However, in the situation where heat is transferred from the enclosed space to the thermal mass to cool the thermal mass, it may be necessary or desirable to include a dehumidification or desiccant system to remove moisture from the thermal mass and the conduit(s) 50 and associated fluid control components so that mold and mildew do not become an issue.

Preferably, although not necessarily, the fluid supplied to the conduit section(s) 50 comprises a gas or a liquid, or both. In the case of a liquid, water, ethanol, methanol, another alcohol, or any other suitable liquid (such as newer refrigerants), could be used. The fluid may undergo a phase change between vapor and liquid phases to enhance heat transfer, although this need not be the case. In fact, the fluid conduit section(s) 50 and, optionally, the thermal mass, may comprise an evaporator section of a heat pump that implements a conventional vapor compression or other refrigeration process. Still further, the fluid may be heated in winter and cooled in summer by a heat exchanger thermally coupled to a source of constant (or nearly constant) temperature fluid, such as an underground aquifer or tank of water. Any known (or later-developed) means and methodology for providing liquid of suitable temperature to the conduit section(s) 50 is contemplated.

Still further, in an alternative embodiment, the fluid conduit section(s) 50 may not be placed in channels, but may be spaced away from the thermal mass and at least partially mounted thereon by spacers or other mounting apparatus separate from or integral with the blocks 20 to minimize heat transfer between the thermal mass and the conduit section(s) 50 and to maximize heat transfer between the conduit section(s) 50 and the enclosed space.

Figure 9:
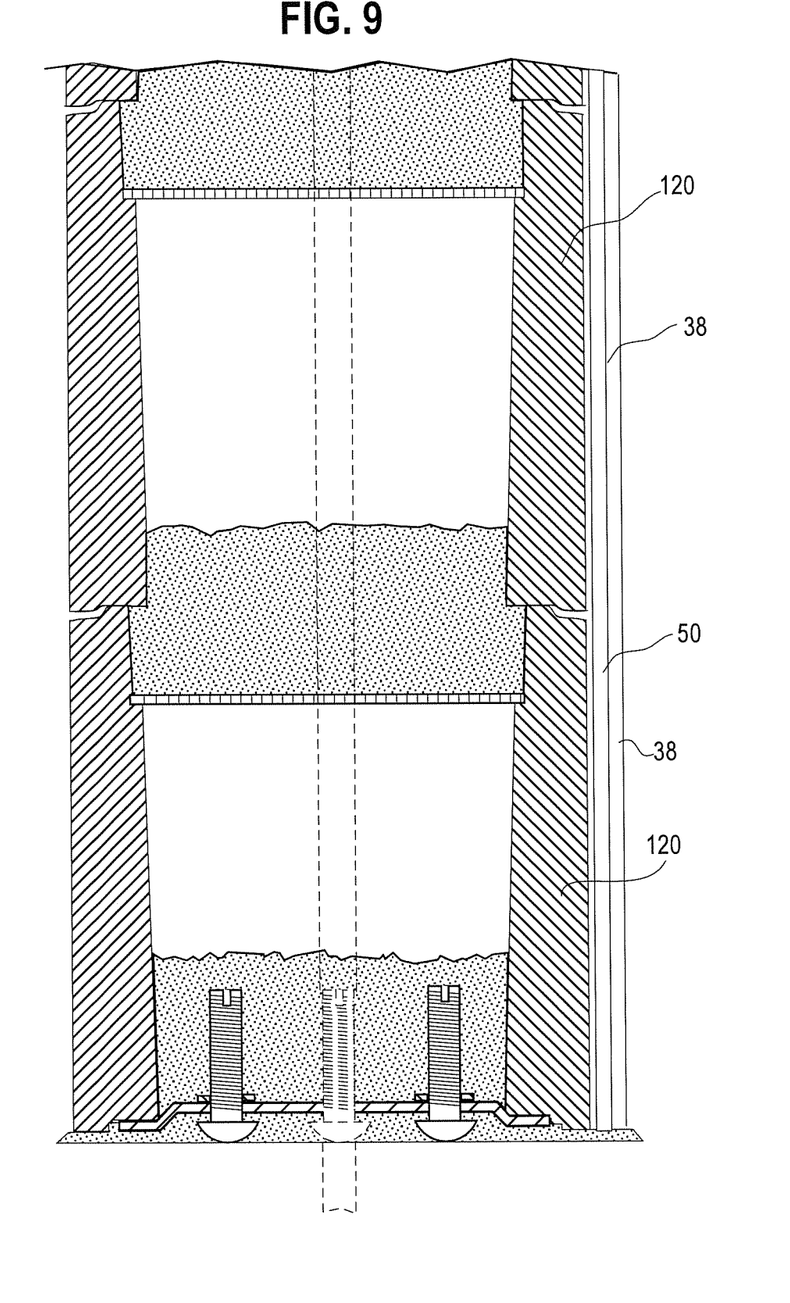
FIG. 9 is a cross-sectional view of an alternative block that may be used to assemble the wall section of FIG. 7.

The present invention is not limited to the block 20 as noted above. For example, the blocks and wall construction system disclosed in U.S. patent application Ser. No. 13/773,302, (hereinafter "the '302 application") filed Feb. 21, 2013, the entire disclosure of which is hereby incorporated by reference herein, may be used. FIG. 9 illustrates one embodiment disclosed in the '302 application, it being understood that any of the embodiments disclosed in such application may be used herein. Blocks 120 are assembled together by laying blocks atop one another in a desired pattern, such as a running bond. A cementitious material, such as grout or mortar is placed into aligned voids in the blocks 120. Conduit section(s) 50 may be placed into aligned channels 38 in the blocks 120 identical or similar to the previous embodiment. Heated or chilled fluid may be passed through the section(s) 50, also as in the previous embodiment.

Other embodiments of the disclosure including all the possible different and various combinations of the individual features (including elements and process steps) of each of the foregoing described embodiments and examples are specifically included herein.

INDUSTRIAL APPLICABILITY

The wall construction system described herein advantageously allows for incorporation of conduit section(s) that conduct a heating or chilling fluid.

Numerous modifications to the present disclosure will be apparent to those skilled in the art in view of the foregoing description. Accordingly, this description is to be construed as illustrative only and is presented for the purpose of enabling those skilled in the art to make and use the present disclosure and to teach the best mode of carrying out same.

I claim:

1. A masonry construction block, comprising:
a first face having a first thickness and a second face opposite the first face and having a second thickness, wherein the first thickness is greater than the second thickness;
a plurality of webs extending between the first and second faces and defining at least one void configured to receive reinforcement material; and
at least one channel in the first face in combination with a fluid conduit disposed therein.

2. The masonry construction block of claim 1, wherein the block includes opposed first and second surfaces that extend between the first and second faces and wherein the at least one channel extends between the first and second surfaces.

3. The masonry construction block of claim 1, further in combination with a fluid pump coupled to the fluid conduit.

4. The masonry construction block of claim 3, wherein the fluid pump delivers at least one of heated and chilled fluid to the fluid conduit.

5. The masonry construction block of claim 1, in combination with a further masonry construction block having a further channel for accepting a fluid conduit therein.

6. The masonry construction block of claim 5, further in combination with the fluid conduit disposed in the at least one channel and the further channel.

7. The masonry construction block of claim 6, wherein the masonry construction blocks are nested together.

8. The masonry construction block of claim 6, wherein the masonry construction blocks are joined together by mortar disposed therebetween.

9. The masonry construction block of claim 1, wherein the at least one channel has a curved portion that contacts and conforms to an outer surface of the fluid conduit disposed therein.

10. The masonry construction block of claim 1, wherein a thermally reflective material is disposed between the fluid conduit and the at least one channel.

11. A wall construction system comprising:
- a first masonry block including a first inner face and a first outer face opposite the first inner face separated by a first distance;
- a second masonry block including a second inner face and a second outer face opposite the second inner face separated by a second distance, wherein the second distance is less than the first distance; and
- wherein the first and second blocks are disposed such that the first and second outer faces are aligned and the first inner face is offset from the second inner face and the first inner face contains at least one channel retaining at least one fluid conduit therein.

12. The wall construction system of claim 11, in combination with a fluid pump coupled to the at least one fluid conduit.

13. The wall construction system of claim 12, wherein the fluid pump delivers at least one of heated and chilled fluid to the at least one fluid conduit.

14. The wall construction system of claim 11, wherein the first and second masonry construction blocks are nested together.

15. The wall construction system of claim 11, wherein the first and second masonry construction blocks are joined together by mortar disposed therebetween.

16. The wall construction system of claim 11, wherein the at least one fluid conduit is in fluid communication with a second conduit at one of a head and a foot of the wall construction system.

17. The wall construction system of claim 16, wherein the at least one fluid conduit is in fluid communication with one of a fluid source and a drain.

18. The wall construction system of claim 11, wherein the at least one fluid conduit is in fluid communication with a second conduit at a head of the wall construction system, and wherein the at least one fluid conduit is in fluid communication with a third conduit at a foot of the wall construction system.

19. The wall construction system of claim 11, wherein the at least one fluid conduit is disposed in the at least one channel and retained therein by at least one of a friction-fit, a press-fit, an adhesive, and a mechanical fastener.

20. A masonry construction block, comprising:
- a main body comprising a cementitious material and including a first face, a second face spaced from and opposite the first face, and a plurality of webs extending between the first and second faces and forming voids spaced from one another and further spaced between and from the first and second faces;
- wherein the first and second faces are bounded by first, second, third, and fourth surfaces that are adapted to be disposed adjacent to surfaces of other construction blocks such that voids of adjacent construction blocks are aligned and adapted to receive reinforcing material therein; and
- wherein the first face has a thickness greater than a thickness of the second face and first and second walls extend into the first face and define a channel that retains a fluid conduit therein.

21. The masonry construction block of claim 20, further in combination with a fluid pump coupled to the fluid conduit.

22. The masonry construction block of claim 21, wherein the fluid pump delivers at least one of heated and chilled fluid to the fluid conduit.

23. The masonry construction block of claim 20, in combination with a further masonry construction block having a further channel for accepting a fluid conduit therein.

24. The masonry construction block of claim 23, further in combination with the fluid conduit disposed in the channel and the further channel.

25. The masonry construction block of claim 24, wherein the masonry construction blocks are nested together.

26. The masonry construction block of claim 24, wherein the masonry construction blocks are joined together by mortar disposed therebetween.

* * * * *